United States Patent
Yeats et al.

(10) Patent No.: US 7,026,400 B2
(45) Date of Patent: *Apr. 11, 2006

(54) AMBIENT TEMPERATURE CURING COATING COMPOSITION

(75) Inventors: Keith Yeats, Northeumberland (GB); Steve Alister Nixon, Newcastle upon Tyne (GB)

(73) Assignee: International Coatings Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 10/722,626

(22) Filed: Nov. 26, 2003

(65) Prior Publication Data

US 2004/0082735 A1  Apr. 29, 2004

Related U.S. Application Data

(62) Division of application No. 09/759,031, filed on Jan. 12, 2001, now Pat. No. 6,743,854.

(30) Foreign Application Priority Data

Jan. 12, 2000  (EP) ................... 00300192

(51) Int. Cl.
C08L 83/06    (2006.01)
(52) U.S. Cl. .................................... 525/100
(58) Field of Classification Search .............. 525/100
See application file for complete search history.

(56) References Cited

U.S. PATENT DOCUMENTS

| | | | |
|---|---|---|---|
| 4,446,259 A | 5/1984 | Vasta | 523/408 |
| 4,589,999 A * | 5/1986 | Vasta | 252/511 |
| 4,877,837 A | 10/1989 | Reising et al. | 525/100 |
| 4,965,312 A | 10/1990 | Nakai et al. | 524/506 |
| 5,077,354 A | 12/1991 | Woo et al. | 528/26 |
| 5,189,102 A | 2/1993 | Tsubuko et al. | 525/112 |
| 5,593,732 A | 1/1997 | Griffith | 427/470.1 |
| 5,663,215 A * | 9/1997 | Milligan | 523/122 |
| 5,719,234 A | 2/1998 | Yabuta et al. | 525/101 |
| 5,852,095 A | 12/1998 | Yamauchi et al. | 524/460 |
| 5,902,851 A * | 5/1999 | Yamaki et al. | 524/506 |
| 5,905,104 A * | 5/1999 | Eklund et al. | 523/435 |
| 6,322,892 B1 | 11/2001 | Takami | 428/418 |
| 6,329,461 B1 | 12/2001 | Akiyama et al. | 524/730 |
| 6,476,160 B1 | 11/2002 | Okuhira et al. | 525/524 |

FOREIGN PATENT DOCUMENTS

| | | |
|---|---|---|
| EP | 0 822 240 A1 | 4/1998 |
| WO | WO 97/22728 A2 | 6/1977 |
| WO | WO 97/22728 A3 | 6/1977 |
| WO | WO 96/16109 A1 | 5/1996 |
| WO | WO 98/04594 A1 | 2/1998 |
| WO | WO 98/32792 A1 | 7/1998 |

* cited by examiner

*Primary Examiner*—Margaret G. Moore
(74) *Attorney, Agent, or Firm*—Lainie E. Parker

(57) ABSTRACT

Ambient temperature curing coating composition comprising a polysiloxane having the formula:

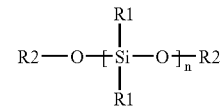

wherein each R1 is selected from the group consisting of alkyl, aryl, and alkoxy groups having up to six carbon atoms, reactive glycidoxy groups, and OSi $(OR3)_3$ groups, wherein each R3 independently has the same meaning as R1, each R2 is selected from the group consisting of hydrogen and alkyl and aryl groups having up to six carbon atoms, and wherein n is selected so that the molecular weight of the polysiloxanes is in the range of from 500 to about 2,000, a glycidyl-functional acrylic polymer, and a hardener.

The composition can be used as a protective coating for large structures such as ships, bridges, buildings, industrial plants, or oil rigs.

14 Claims, No Drawings

AMBIENT TEMPERATURE CURING COATING COMPOSITION

This application is a divisional of application Ser. No. 09/759,031, filed Jan. 12, 2001 now U.S. Pat. No. 6,743,854, which claims priority of European Patent Application No. 00300192.2 filed on Jan. 12, 2000.

FIELD OF THE INVENTION

The present invention relates to a coating composition fast curing at ambient temperature (touch dry in less than 2 hours at 25° C.) with a high solids content (>70% by weight) and a low VOC (<250 grams solvent per litre of the composition, g/l) which can be used in durable protective coatings.

BACKGROUND OF THE INVENTION

There has been increased concern in recent years about the release of volatile solvents into the atmosphere, and there has been a consequent need to reduce the volatile organic solvent content of coating, sealant, and adhesive compositions. This has not been easy for coating compositions, which require a relatively low viscosity of below 20 Poise for application by the usual methods of spray, roller or brush, and particularly not for coating compositions which have to be applied and cure rapidly at ambient temperature, for example coatings for large structures such as ships, bridges, buildings, industrial plants, and oil rigs. Coating compositions generally need to contain a polymer to confer film-forming properties, but any polymer used needs to be of sufficient molecular weight to give the required low viscosity, particularly after pigmentation as a paint. Such low-viscosity polymers often require long curing times to develop satisfactory mechanical properties, especially when cured at low temperature.

In WO 98/04594 a process is disclosed for the preparation of a curable polymer composition by polymerisation of a functional olefinically unsaturated monomer in the presence of a reactive diluent which is a liquid organic compound of viscosity less than 2 Pa·s (20 Poise) having at least one functional group which is substantially non-reactive with the functional olefinically unsaturated monomer and which is capable of reacting with a curing agent to form a polymer network. The major drawback of this technology is that this low-viscous coating material results in a low final film $T_g$ and moderate durability.

In WO 96/16109 and WO 98/32792 an epoxy-polysiloxane coating composition is disclosed that is prepared by combining water, a polysiloxane, a difunctional aminosilane hardener, optionally an organooxysilane, and a non-aromatic epoxy resin. The maximum amount of solvent added to these compositions is approximately 420 g/l. The compositions are intended to be used as protective coatings for primed or galvanised steel, aluminium, concrete, and other substrates at a dry film thickness in the range of 25 μm to about two millimetres. Whilst these compositions are employed as durable topcoats, their gloss and colour retention properties when exposed to natural or accelerated test conditions (UV-A, UV-B) are not as expected for polysiloxane based compositions. This strongly affects the appearance of a coated substrate.

U.S. Pat. No. 4,446,259 discloses a coating composition having a liquid carrier and a binder which is a blend of an olefinically unsaturated polymer containing glycidyl groups and a crosslinkable polysiloxane having attached to the silicone atoms of its backbone alkyl, phenyl, and hydroxyl groups. These compositions are used as ambient temperature curing protective coatings. The major drawback of these compositions is the presence of a relatively large amount of organic solvent in the composition.

EP 0 822 240 discloses a coating resin composition comprising a silica-dispersed oligomer solution of an organosilane, an acrylic resin, and a curing catalyst. The coating resin compositions on average have a solid content in the range of 40–50% by weight. Consequently, these coating compositions have a VOC well above 250 g/l.

WO 97/22728 discloses a heat-resistant powder coating composition comprising at least one glycidyl-functional polyacrylic polymer and at least one hydroxyl-functional polysiloxane. This composition is cured at temperatures greater than about 250° C. This high-curing temperature renders the composition unsuitable for use in the coating of large structures such as ships, bridges, etc. Further, this coating composition is not curable unless the coated surface is heated.

SUMMARY OF THE INVENTION

The present invention provides a solution to the drawbacks associated with the above-mentioned prior art. The ambient temperature curing coating composition according to the present invention comprises:

a linear or branched polysiloxane having the formula

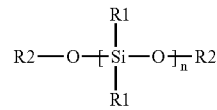

wherein each R1 is independently selected from the group consisting of alkyl, aryl, alkoxy groups having up to six carbon atoms, reactive glycidoxy groups, and OSi(OR3)$_3$ groups, wherein each R3 independently has the same meaning as R1, each R2 is selected from the group consisting of hydrogen and alkyl and aryl groups having up to six carbon atoms, and wherein n is selected so that the molecular weight of the polysiloxanes is in the range of from 200 to about 5,000, preferably 500–2,000, a glycidyl-functional acrylic polymer, and a hardener.

DETAILED DESCRIPTION OF THE INVENTION

It is preferred that R1 and R2 comprise groups having fewer than six carbon atoms to facilitate rapid hydrolysis of the polysiloxane, which reaction is driven by the volatility of the alcohol analogue product of the hydrolysis. R1 and R2 groups having more than six carbon atoms tend to impair the hydrolysis of the polysiloxane due to the relatively low volatility of each alcohol analogue. Preference is given to the use of alkoxysilyl-functional polysiloxane. Methoxy-, ethoxy-, and silanol-functional polysiloxanes having molecular weights in the range of about 400 to about 2000 are preferred for formulating coating compositions according to present invention. Methoxy-, ethoxy-, and silanol-functional polysiloxanes having molecular weights of less than 400 would produce a coating composition that would be brittle and offer poor impact resistance. Any liquid methoxy-, ethoxy-, and silanol-functional polysiloxane with a molecular weight above 400 can be used, though it is preferred to use polysiloxanes with a molecular weight of less than 2000, as they enable the production of compositions that require few if any additional solvents to achieve application viscosity, i.e. which can be used without adding solvent in excess of current volatile organic content (VOC) requirements. In general, a high-molecular weight polysiloxane can be used without violating VOC requirements by mixing it with a reactive or non-reactive diluent. However, normally this will affect film properties.

Suitable polysiloxanes that can be used in the composition according to the present invention include: DC 3037 and DC 3074 (both ex Dow Corning), or SY 231, SY 550, and MSE 100 (all ex Wacker)

The glycidyl-functional acrylic polymer can be prepared by copolymerizing one or more olefinically unsaturated monomers with a glycidyl-functional olefinically unsaturated monomer.

Examples of ethylenically unsaturated monomers which can be copolymerised with such a glycidyl-functional olefinically unsaturated monomer are acrylic esters such as butyl(meth)acrylate, methyl(meth)acrylate, ethyl(meth)acrylate, propyl(meth)acrylate, n-hexyl(meth)acrylate, isopropyl(meth)acrylate, butyl(meth)acrylate, 2-ethylhexyl methacrylate or acrylate, cyclohexyl(meth)acrylate, 2,2,5-trimethylcyclohexyl(meth)acrylate, isobornyl(meth)acrylate, acrylonitrile, methacrylonitrile, trimethoxysilyl propyl (meth)acrylate, and vinyl compounds such as styrene, vinyl acetate or vinyl chloride, wherein the notation (meth)acrylate means acrylate or methacrylate.

The glycidyl-functional olefinically unsaturated monomer in general can be any one of the above-mentioned olefinically unsaturated monomers functionalised with one or more epoxide groups. Glycidyl methacrylate is one of the preferred monomers in the preparation of the glycidyl-functional acrylic polymer.

To prepare a coating composition with a low VOC, the glycidyl-functional acrylic polymer can be prepared, for example, by free radical polymerisation or any other reaction in the presence of a reactive diluent which is an organic compound of viscosity less than 2 Pa·s (20 Poise) at 25° C. Preference is given to the use of a reactive diluent having at least one functional group which is substantially non-reactive with the olefinically unsaturated monomers and which is capable of reacting with a curing agent to form a polymer network. It was found that low-viscosity polysiloxanes can be used in the preparation of the glycidyl-functional acrylic polymer that is present in the coating composition according to the present invention.

In a highly preferred embodiment, the reactive diluent is a polysiloxane, and this polysiloxane is the same as the polysiloxane that is present in the coating composition according to the present invention.

Reactive diluents that can be used in the preparation of the glycidyl-functional acrylic polymer include alkoxysilyl-functional polysiloxanes, such as DC 3037 and DC 3074 (both ex Dow Corning), or SY 231, SY 550, and MSE 100 (all ex Wacker), monomeric alkoxysilanes, such as trimethoxypropyl silane and dimethoxydiphenyl silane, and organofunctional monomeric alkoxysilanes, such as glycidoxypropyl trimethoxysilane, glycidoxypropyl triethoxysilane, acetoacetoxypropyl trimethoxysilane, and acetoacetoxypropyl triethoxysilane.

Very good results are achieved when the glycidyl-functional acrylic polymer is obtained by polymerising a mixture comprising glycidyl methacrylate and butyl acrylate in the polysiloxane that is also present in the coating composition. Optionally, the mixture further comprises methyl methacrylate and/or other acrylic monomers. In general, it can be said that good results are achieved when the mixture comprises 5–60% by weight of glycidyl methacrylate, 0–60% by weight of methyl methacrylate, and 10–80% by weight of butyl acrylate, better results are achieved when the mixture comprises 18–55% by weight of glycidyl methacrylate, 0–45% by weight of methyl methacrylate, and 25–70% by weight of butyl acrylate, and optimum results are achieved when the mixture comprises 40–50% by weight of glycidyl methacrylate, 0–15% by weight of methyl methacrylate, and 50–60% by weight of butyl acrylate, wherein the % by weight is calculated based on the total amount of olefinically unsaturated monomers present in the mixture before the start of the polymerisation reaction.

As indicated above, preference is given to a process for the preparation of the glycidyl-functional acrylic polymer from ethylenically unsaturated monomer by addition polymerisation while in solution. The polymerisation is preferably carried out in the substantial absence of non-functional volatile solvent, that is, a solvent which will not react with the curing agent for the polymer.

Alternatively, a small proportion, for example up to 10 to 20% by weight of the polymerisation reaction mixture, of a non-functional volatile solvent which is miscible with the reactive diluent can be present. Some or all of the monomers can be pre-dissolved in the reactive diluent, but preferably the monomers, together with (a) free radical initiator(s) and any chain transfer agent used, are gradually added to the diluent. For example, the reactive diluent can be heated to a temperature in the range of 50–2000° C., and the monomers, initiator, and chain transfer agent are added over a period of up to 12 hours, preferably in 4 hours, while the temperature of the solution is maintained during the addition and for a further period of 0.5–4 hours after the addition. A further charge of initiator may be added during this further period to reduce the level of unreacted monomer. However, it is also possible to reduce this level by distilling off the unreacted monomer from the reaction mixture.

The free radical initiator can for example be a peroxide or peroxy-ester such as benzoyl peroxide, di-tert-butyl peroxide, tert-butyl peroxy-3,5,5-trimethylhexanoate, 2,5-bis(2-ethylhaxanoyl-peroxy)-2,5-dimethylhexane, or tertiary butyl peroctoate or an azo compound such as azobisisobutyronitrile or azo-bis(2-methylbutyronitrile).

A chain transfer agent, for example dodecanethiol, butanethiol, pentaerythritol tetra(mercaptopropionate), mercaptopropyl trimethoxysilane, or dibutyl phosphite, may be present during polymerisation. The level of initiator and of chain transfer agent, if present, is preferably controlled so that the number average molecular weight Mn of the polymer produced is not more than 10,000 and is preferably in the range of 600 to 5,000, most preferably 1,000 to 3,000, in order to maintain a workable viscosity. However, it is possible to get a workable composition using a polymer with a molecular weight above 1,000, albeit that relatively high levels of monomeric compounds and/or solvent need to be added to achieve application viscosity. For example, the amount of free radical initiator used (by weight based on monomers) is generally at least 1%, preferably 2 to 10%, when no chain transfer agent is used, or a level of 1 to 5% initiator can be used in conjunction with 1 to 10% chain transfer agent.

The coating composition according to the present invention also comprises a hardener or curing agent. The curing agent which is present in the curable polymer composition in general can be any curing agent active in crosslinking the functional groups present in the olefinically unsaturated polymer and/or in the reactive diluent under the intended conditions of curing. The curing agent can for example be thiol-functional or amino-functional. Preferably, the curing agent is an amine chosen from the general classes of aliphatic amines, aliphatic amine adducts, polyamidoamines, cycloaliphatic amines and cycloaliphatic amine adducts, aromatic amines, Mannich bases, and ketimines, which each may be substituted wholly or in part with an aminosilane having the general formula Y—Si—(O—X)$_3$, wherein Y is H(HNR)$_a$ and a is an integer from one to six, each R is a difunctional organic radical independently selected from the group consisting of aryl, alkyl, dialkylaryl, alkoxyalkyl, and cycloalkyl radicals, and R can vary within each Y molecule. Each X may be the same or different, and is limited to alkyl, hydroxyalkyl, alkoxyalkyl, and hydroxyalkoxyalkyl groups containing fewer than about six carbon atoms.

Preferred aminosilanes are, for example: 3-aminoethyl triethoxysilane, 3-aminopropyl triethoxysilane, n-phenylaminopropyl trimethoxysilane, trimethoxysilylpropyl diethylene triamine, 3-(3-aminophenoxy)propyl trimethoxysilane, aminoethyl aminomethylphenyl trimethoxysilane, 2-aminoethyl 3-aminopropyl, tris 2-ethylhexoxysilane, n-aminohexyl aminopropyl trimethoxysilane, and trisaminopropyl trimethoxy ethoxysilane, or mixtures thereof.

However, the curing agent can also contain a mercaptosilane, a polyamine, or polythiol.

In a preferred embodiment, the coating composition comprises from 45 to 75% by weight of the polysiloxane, from 20 to 45% by weight of the glycidyl-functional acrylic polymer, and from 4 to 11% by weight of the hardener. Optimum results are found for a coating composition comprising from 60 to 70% by weight of the polysiloxane, from 20 to 30% by weight of the glycidyl-functional acrylic polymer, and from 7 to 11% by weight of the hardener. The % by weight is calculated on the basis of the weight of the coating composition.

Optionally, the coating composition according to the present invention comprises a low-molecular weight alkoxysilane having the general formula

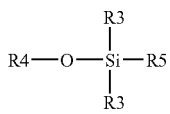

wherein R3 is selected from the group consisting of alkyl and cycloalkyl groups containing up to six carbon atoms and aryl groups containing up to ten carbon atoms. R4 is independently selected from the group consisting of alkyl, hydroxyalkyl, alkoxyalkyl, and hydroxyalkoxyalkyl groups containing up to six carbon atoms. R5 is independently selected from the group consisting of alkyl, alkoxy, hydroxyalkyl, alkoxyalkyl, and hydroxyalkoxyalkyl groups containing up to six carbon atoms. An example of a low-molecular weight alkoxysilane according to the above formula that can be used in the coating composition is dimethoxydiphenyl silane.

The coating compositions according to the invention may contain a compound which acts as a catalyst for Si—O—Si condensation. In general, the coatings are capable of curing under ambient temperature and humidity conditions to a tack-free coating in 2 to 20 hours even without such a catalyst, but a catalyst may be preferred to give a faster cure.

One example of a catalyst for Si—O—Si condensation is an alkoxytitanium compound, for example a titanium chelate compound such as a titanium bis(acetylacetonate)dialkoxide, e.g., titanium bis(acetylacetonate) diisopropoxide, a titanium bis(acetoacetate)dialkoxide, e.g., titanium bis(ethylacetoacetate)diisopropoxide, or an alkanolamine titanate, e.g., titanium bis(triethanolamine)diisopropoxide, or an alkoxytitanium compound which is not a chelate such as tetra(isopropyl)titanate or tetrabutyl titanate. Such titanium compounds containing alkoxy groups bonded to the titanium may not act as catalysts alone, since the titanium alkoxide group is hydrolysable and the catalyst may become bound to the cured silane or siloxane by Si—O—Ti linkages. The presence of such titanium moieties in the cured product may be advantageous in giving even higher heat stability. The titanium compound can for example be used at 0.1 to 5% by weight of the binder. Corresponding alkoxide compounds of zirconium or aluminium are also useful as catalysts.

An alternative catalyst is a nitrate of a polyvalent metal ion such as calcium nitrate, magnesium nitrate, aluminium nitrate, zinc nitrate, or strontium nitrate. Calcium nitrate has been suggested as a catalyst for the amine curing of epoxy resins, but it has never been suggested for the curing of silane or siloxane materials. Surprisingly, we have found that calcium nitrate is an effective catalyst for the curing by Si—O—Si condensation of a silane or siloxane containing at least two alkoxy groups bonded to silicon by Si—O—C bonds, when the composition also includes an organic amine. The calcium nitrate is preferably used in its tetrahydrate form but other hydrated forms can be used. The level of calcium nitrate catalyst required is generally not more than 3% by weight of the binder, for example 0.05 to 3% by weight. Coatings cured using calcium nitrate catalyst are especially resistant to yellowing on exposure to sunlight.

Another example of a suitable catalyst is an organotin compound, for example a dialkyltin dicarboxylate such as dibutyltin dilaurate or dibutyltin diacetate. Such an organotin catalyst can for example be used at 0.05 to 3% by weight of the binder of the coating composition.

Other compounds effective as catalysts in the coating compositions of the invention are organic salts, such as carboxylates, of bismuth, for example bismuth tris(neodecanoate). Organic salts and/or chelates of other metals such as zinc, aluminium, zirconium, tin, calcium, cobalt, or strontium, for example zirconium acetylacetonate, zinc acetate, zinc acetylacetonate, zinc octoate, stannous octoate, stannous oxalate, calcium acetylacetonate, calcium acetate, calcium 2-ethylhexanoate, cobalt naphthenate, calcium dodecylbenzenesulphonate, or aluminium acetate, may also be effective as catalysts.

The coating compositions of the invention may contain one or more further ingredients. They may for example contain one or more pigments, for example titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate and/or a filler pigment such as barytes, talc or calcium carbonate. The composition may contain a thickening agent such as fine-particle silica, bentonite clay, hydrogenated castor oil, or a polyamide wax. The composition may also contain a plasticiser, pigment dispersant, stabiliser, flow aid, or thinning solvent.

The coating compositions of the invention generally cure at ambient temperatures, for example 5 to 30° C., and are thus suitable for application to large structures where heat-curing is impractical. The coating compositions of the invention alternatively can be cured at elevated temperatures, for example from 30 to 50° C. up to 100 or 130° C., to speed up the curing. The hydrolysis of silicon-bonded alkoxy groups depends on the presence of moisture; in almost all climates atmospheric moisture is sufficient but a controlled amount of moisture may need to be added to the coating when curing at elevated temperature or when curing in very low humidity (desert) locations. The water is preferably packaged separate from any compound or polymer containing silicon-bonded alkoxy groups.

The coating compositions of the invention in general can be used as finish coatings and/or primer coatings. Coating compositions containing a relatively high proportion of polysiloxane have a high gloss which is retained remarkably well on weathering and UV exposure. They are particularly suitable for coating substrates which are exposed to the weather, e.g. sunlight, for long periods before recoating. The highest levels of gloss may be achieved if the coating composition includes an organic solvent (thinner) such as xylene, although use of solvent is not generally necessary in the coating compositions of the invention, which can be 100% solids coatings having a very low measured volatile organic content. The coating composition may contain an alcohol, e.g. ethanol or butanol, preferably packaged with the alkoxysilyl-functional component, to extend pot life and control initial speed of curing. A finish coating according to the invention can be applied over various primer coatings, for example inorganic zinc silicate or organic zinc-rich silicate primers and organic, e.g. epoxy resin, primers containing zinc metal, corrosion-inhibiting, metal flake or barrier pigments. The coating composition of the invention has particularly good adhesion to inorganic zinc silicate coatings without needing an intermediate tie coat or mist coat. A finish coating composition of the invention can also be applied directly over aluminium or zinc "metal spray" coatings, in which case it acts as a sealer as well as a top coat, or over galvanised steel, stainless steel, aluminium, or plastics surfaces such as glass fibre reinforced polyester or a polyester gel coat. The coating composition can for example be used as a finish coating on buildings, steel structures, automobiles, aircraft and other vehicles, and general industrial machinery and fitments. The finish coating can be pigmented or it can be a clear (non-pigmented) coat, particularly on cars or yachts. The coating composition can be applied directly to prepared carbon steel as a primer/finish.

The coating composition of the invention alternatively can be used as a protective primer coating, particularly on steel surfaces, for example bridges, pipelines, industrial plants or buildings, oil and gas installations, or ships. For this use it is generally pigmented with anticorrosive pigments. It may for example be pigmented with zinc dust; coatings according to the invention have a similar anticorrosive performance to known zinc silicate coatings but are less liable to mud-cracking and can be readily overcoated, particularly with a polysiloxane finish, for example a finish coat according to the present invention. Primer coating compositions according to the invention can be used as maintenance and repair coatings on less than perfect surfaces such as aged blasted steel or "ginger" (steel which has been blasted and has started to rust in small spots), hand-prepared weathered steel, and aged coatings.

As well as outstanding resistance to UV weathering, the coatings produced from the compositions of the invention have good flexibility and adhesion to most surfaces and have higher heat resistance (up to 150° C. and usually up to 200° C.) than most organic coatings.

The invention will be elucidated with reference to the following examples. These are intended to illustrate the invention but are not to be construed as limiting in any manner the scope thereof.

In the examples, pbw has the meaning of parts by weight.

EXAMPLES

Example 1

Polymer Preparation

An acrylic polymer was prepared in a reaction vessel equipped with a mechanical stirrer, a nitrogen inlet tube, a temperature controller, a reflux condenser, and inlet tubes for the addition of reagents during the reaction. A polysiloxane (Dow Corning DC 3074) was charged to the vessel and heated to 140° C. with stirring under nitrogen. A mixture of butyl acrylate, glycidyl methacrylate, methyl methacrylate, and an initiator (di-tert butyl peroxide=Trigonox B) was added over a period of 4 hours. After the addition was completed, the temperature was maintained at 140° C. for 2 hours. Then the product was allowed to cool before being discharged from the reaction vessel. The viscosity of the obtained product was measured at 25° C. using a Brookfield 1000 CAP viscometer equipped with a no.6 cone. Details on the formulation and its properties are given in Table 1.

Example 2

Polymer Preparation

An acrylic polymer was prepared using the method of Example 1, with the reaction being carried out at 150° C. Details on the formulation and its properties are given in Table 1.

Examples 3–18

Polymer Preparation

Different acrylic polymers were prepared using the method of Example 1. Details on the formulations and their properties are given in Table 1.

Example 19

Polymer Preparation

An acrylic polymer was prepared using the method of Example 1, with the reaction being carried out at 114° C. Trigonox 42S in 5 parts by weight of xylene was used as initiator. Details on the formulation and its properties are given in Table 1.

Example 20

Polymer Preparation

An acrylic polymer was prepared using the method of Example 1, with the reaction being carried out at 85° C. Trigonox 141 in 5 parts by weight of xylene was used as initiator. Details on the formulation and its properties are given in Table 1.

Example 21

Coating Composition

A coating composition was prepared using polymer 1 by mixing polymer 1 and pigment (titanium dioxide) using a high-speed dispenser. Xylene was added to reduce the viscosity of the mixture below 10 Poise. A curing agent (3-aminopropyltriethoxysilane) and a catalyst (dibutyltin diacetate) were added and the mixture was stirred by hand before being applied to test panels. Details on the formulation of the coating composition and its viscosity properties are given in Table 2.

Example 22

Coating Composition

A coating composition was prepared using polymer 2 by mixing polymer 2 and titanium dioxide using a high-speed dispenser. Xylene was added to reduce the viscosity of the mixture below 10 Poise. A curing agent (3-aminopropyltriethoxysilane) and a catalyst (bismuth neodecanoate) were added and the mixture was stirred by hand before being applied to test panels. Details on the formulation of the coating composition and its viscosity properties are given in Table 2.

TABLE 1

| Example | DC 3074[1] (pbw) | BA[2] (pbw) | GMA[3] (pbw) | MMA[4] (pbw) | Tri-B[5] (pbw) | Visco A[6] (Poise) | Visco B[7] (Poise) |
|---|---|---|---|---|---|---|---|
| 1  | 61 | 25 | 8  | 6  | 1.3 | 69   | 8  |
| 2  | 70 | 17 | 13 | 0  | 1.3 | 20.5 |    |
| 3  | 55 | 15 | 15 | 15 | 1.6 | >100 | 64 |
| 4  | 72 | 10 | 12 | 7  | 1.0 | 67   | 6  |
| 5  | 50 | 25 | 15 | 5  | 1.5 | >100 | 22 |
| 6  | 65 | 17 | 11 | 7  | 1.2 | >100 | 11 |
| 7  | 61 | 16 | 8  | 15 | 1.5 | >100 | 16 |
| 8  | 78 | 15 | 8  | 0  | 0.8 | 15   | 2  |
| 9  | 68 | 10 | 8  | 15 | 1.3 | >100 | 10 |
| 10 | 64 | 25 | 11 | 0  | 1.2 | 46   | 6  |
| 11 | 78 | 10 | 12 | 0  | 0.7 | 18   | 2  |
| 12 | 55 | 20 | 15 | 10 | 1.6 | >100 | 36 |
| 13 | 71 | 16 | 9  | 3  | 1.0 | 28   | 3  |
| 14 | 68 | 18 | 15 | 0  | 1.1 | 51   | 5  |
| 15 | 68 | 18 | 15 | 0  | 1.1 | 53   | 6  |
| 16 | 60 | 10 | 15 | 15 | 1.5 | >100 | 54 |
| 17 | 78 | 15 | 8  | 0  | 0.8 | 15   | 2  |
| 18 | 55 | 22 | 8  | 15 | 1.7 | >100 | 27 |
| 19 | 70 | 17 | 13 | 0  | 1.0[8] | 16 |    |
| 20 | 70 | 17 | 13 | 0  | 1.0[9] | 32 |    |

[1]Dow Corning DC 3074
[2]Butyl acrylate
[3]Glycidyl methacrylate
[4]Methyl methacrylate
[5]Trigonox-B
[6]Viscosity of the polymer
[7]Viscosity of the polymer a at 90% non-volatile content in xylene
[8]Trigonox 42S
[9]Trigonox 141

Examples 23–38

Coating Compositions

Coating compositions were prepared according to the procedure of Example 21, using polymers 3–18. Details on the formulation of the coating compositions and their viscosity properties are given in Table 2.

Some of the test panels were irradiated with UV-A or UV-B radiation under accelerated test conditions. They showed a gloss retention of about 90% after 200 days of UV-A irradiation. This is a major improvement in comparison to state of the art protective coatings based on polysiloxane formulations.

The panels showed a gloss retention of about 40% after 200 days of UV-B irradiation. This is also a major improvement in comparison to state of the art protective coatings based on polysiloxane formulations, which show a gloss retention well below 10% upon UV-B irradiation for such a period of time.

TABLE 2

| Coating Example | Polymer Example | Polymer (pbw) | Pigment (pbw) | C.A.[1] (pbw) | Cat.[2] (pbw) | xylene (pbw) | Visco[3] |
|---|---|---|---|---|---|---|---|
| 21 | 1  | 60 | 30 | 3   | 0.2 | 11 | 4.7 |
| 22 | 2  | 67 | 33 | 6.6 | 0.1 | 0  |     |
| 23 | 3  | 54 | 27 | 7   | 0.3 | 19 | 4.0 |
| 24 | 4  | 61 | 30 | 5   | 0.3 | 9  | 4.2 |
| 25 | 5  | 57 | 29 | 5   | 0.3 | 14 | 4.4 |
| 26 | 6  | 59 | 29 | 4   | 0.2 | 12 | 4.0 |
| 27 | 7  | 58 | 29 | 3   | 0.2 | 13 | 5.2 |
| 28 | 8  | 63 | 32 | 3   | 0.2 | 5  | 4.4 |
| 29 | 9  | 59 | 30 | 3   | 0.2 | 11 | 4.3 |
| 30 | 10 | 61 | 30 | 4   | 0.2 | 9  | 4.5 |
| 31 | 11 | 63 | 32 | 5   | 0.2 | 5  | 3.9 |
| 32 | 12 | 56 | 28 | 6   | 0.3 | 16 | 4.0 |
| 33 | 13 | 62 | 31 | 3   | 0.2 | 7  | 4.2 |
| 34 | 14 | 61 | 30 | 6   | 0.3 | 9  | 3.3 |
| 35 | 15 | 59 | 29 | 3   | 0.2 | 12 | 4.8 |
| 36 | 16 | 61 | 30 | 6   | 0.3 | 9  | 3.5 |
| 37 | 17 | 63 | 32 | 3   | 0.1 | 5  | 4.6 |
| 38 | 18 | 57 | 28 | 3   | 0.2 | 15 | 5.0 |

[1]C.A. = curing agent
[2]Cat. = catalyst
[3]Viscosity of the coating composition measured at 25° C. using a Brookfield 1000 CAP viscometer equipped with a no.6 cone.

The invention claimed is:

1. An ambient temperature curing coating composition comprising
   a branched polysiloxane having the formula

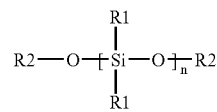

wherein each R1 is selected from the group consisting of alkyl, aryl, and alkoxy groups having up to six carbon atoms, reactive glycidoxy groups, and OSi(OR3)$_3$ groups, wherein each R3 independently has the same meaning as R1, each R2 is selected from the group consisting of hydrogen and alkyl and aryl groups having up to six carbon atoms, and wherein n is selected so that the molecular weight of the polysiloxanes is in the range of from 500 to about 2,000,
   a glycidyl-functional acrylic polymer, and
   a hardener,
said coating composition having a solids content of more than 70% by weight.

2. The coating composition according to claim 1, wherein the glycidyl-functional acrylic polymer is obtained by polymerisation in the polysiloxane.

3. The coating composition according to claim 1, wherein the polysiloxane is an alkoxysilyl-functional polysiloxane.

4. The coating composition according to claim 1, wherein the glycidyl-functional acrylic polymer is obtained by polymerising a mixture comprising glycidyl methacrylate and butyl acrylate.

5. The coating composition according to claim 4, wherein the mixture further comprises methyl methacrylate.

6. The coating composition according to claim 5, wherein the mixture comprises 15–76% by weight of glycidyl methacrylate, 0–60% by weight of methyl methacrylate, and 30–85% by weight of butyl acrylate.

7. The coating composition according to claim 1, wherein the composition comprises from 45 to 75% by weight of the polysiloxane, from 20 to 45% by weight of the glycidyl-functional acrylic polymer, and from 4 to 11% by weight of the hardener, with % by weight being calculated on the basis of the weight of the coating composition.

8. The coating composition according to claim 7, wherein the composition comprises from 60 to 70% by weight of the polysiloxane, from 20 to 30% by weight of the glycidyl-functional acrylic polymer, and from 7 to 11% by weight of the hardener, with % by weight being calculated on the basis of the weight of the coating composition.

9. A method of protectively coating a substrate comprising applying the coating composition according to claim 1 as a protective coating.

10. A method of coating a substrate comprising applying to the substrate the coating composition according to claim 1 at ambient temperature.

11. The method of claim 10, wherein the substrate is a ship, bridge, building, industrial plant, or oil rig.

12. An ambient temperature curing coating composition comprising
a polysiloxane having the formula

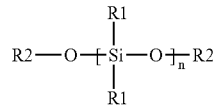

wherein each R1 is selected from the group consisting of alkyl, aryl, and alkoxy groups having up to six carbon atoms, reactive glycidoxy groups, and OSi(OR3)$_3$ groups, wherein each R3 independently has the same meaning as R1, each R2 is selected from the group consisting of hydrogen and alkyl and aryl groups having up to six carbon atoms, and wherein n is selected so that the molecular weight of the polysiloxanes is in the range of from 500 to less than 2,000, a glycidyl-functional acrylic polymer obtained by polymerising a mixture comprising 15–75% by weight of glycidyl methacrylate, 0–60% by weight of methyl methacrylate, and 30–85% by weight of butyl acrylate, and a hardener, said coating composition having a solids content of more than 70% by weight.

13. An ambient temperature curing coating composition comprising
from 45 to 75% by weight of a polysiloxane having the formula

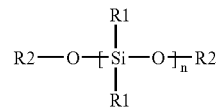

wherein each R1 is selected from the group consisting of alkyl, aryl, and alkoxy groups having up to six carbon atoms, reactive glycidoxy groups, and OSi(OR3)$_3$ groups, wherein each R3 independently has the same meaning R1, each R2 is selected from the group consisting of hydrogen and alkyl and aryl groups having up to six carbon atoms, and wherein n is selected so that the molecular weight of the polysiloxanes is in the range of from 500 to less than 2,000, from 20 to 45% by weight of a glycidyl-functional acrylic polymer, and from 4 to 11% by weight of a hardener, with % by weight being calculated on the basis of the weight of the coating composition, said coating composition having a solids content of more than 70% by weight.

14. The coating composition according to claim 13, wherein the composition comprises from 60 to 70% by weight of the polysiloxane, from 20 to 30% by weight of the glycidyl-functional acrylic polymer, and from 7 to 11% by weight of the hardener, with % by weight being calculated on the basis of the weight of the coating composition.

* * * * *

UNITED STATES PATENT AND TRADEMARK OFFICE
CERTIFICATE OF CORRECTION

PATENT NO. : 7,026,400 B2
APPLICATION NO. : 10/722626
DATED : April 11, 2006
INVENTOR(S) : Yeats et al.

It is certified that error appears in the above-identified patent and that said Letters Patent is hereby corrected as shown below:

Col. 11, Claim 6, Line 8    "15-76%"

should read    --15-75% --

Col. 12, Claim 13, Line 28,    "same meaning R1,"

should read    -- same meaning as R1, --

Signed and Sealed this

First Day of August, 2006

JON W. DUDAS
*Director of the United States Patent and Trademark Office*